(No Model.)

E. S. GIBBS.
Churn.

No. 238,228. Patented March 1, 1881.

Witnesses:
G. B. Towles.
H. A. Daniels

Inventor:
Eugene S. Gibbs
By W. T. Burris
Attorney.

UNITED STATES PATENT OFFICE.

EUGENE S. GIBBS, OF LYONS, IOWA.

CHURN.

SPECIFICATION forming part of Letters Patent No. 238,228, dated March 1, 1881.

Application filed November 27, 1880. (No model.)

*To all whom it may concern:*

Be it known that I, EUGENE S. GIBBS, of Lyons, in the county of Clinton and State of Iowa, have invented certain new and useful Improvements in Churns; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists of a V-shaped breaker located and arranged in relation to the adjustable beaters of the churn so as to divide the currents of cream produced by the beaters and conduct those currents upward and outward, thus producing a partial vacuum in the cream and facilitating the churning process, as hereinafter fully set forth.

Figure 1:
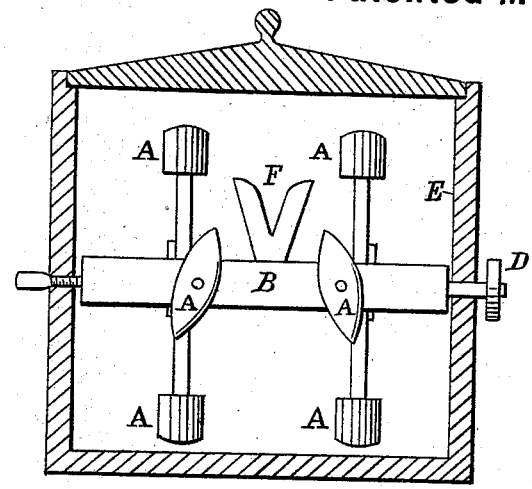
Figure 2:
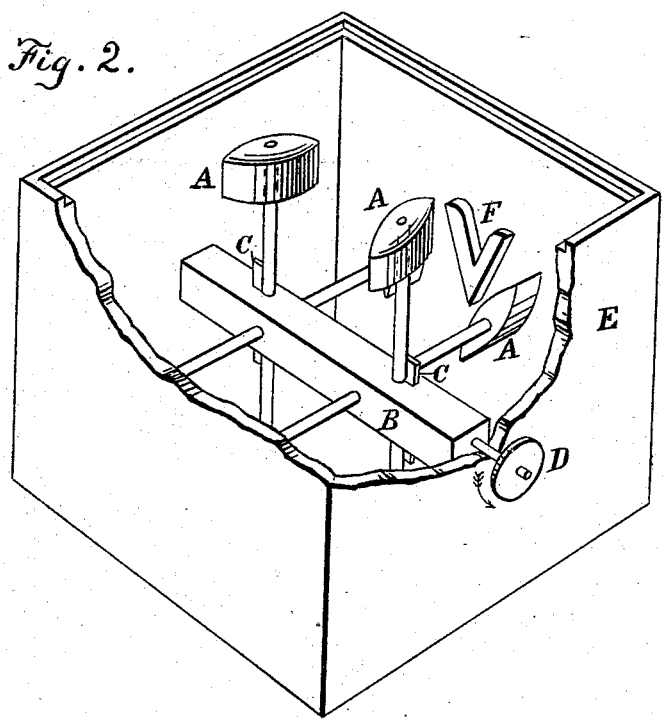

Figure 1 is a vertical section, and Fig. 2 is a perspective view with a portion of the churn-casing broken away, showing the arrangement of the beaters.

A represents wedge or oval shape beaters fastened to arms extended through mortises, and secured by keys C in the mortises in the shaft B, having its bearings in the casing E of the churn. On one end of the shaft is a pinion, D, to be operated by a gear-wheel and crank. (Not shown.)

F is a single V-shaped breaker, located at or near the center of the churn, and arranged in relation to the beaters, as shown in the drawings, so as to divide the cream-currents produced by the beaters and conduct these currents upward and outward toward the opposite ends or sides of the churn for the purpose of producing a partial vacuum in the cream and facilitating the churning process.

The crank of the gear-wheel being turned from the operator, the pinion, shaft, and beaters are revolved in the direction shown by the arrow in Fig. 2, the beaters producing currents in the cream, causing a strong confluence at or near the lower point of the breaker F, which, by its V shape, divides the currents, directing them to the opposite ends near the top of the churn, and producing partial vacuums in the cream, which facilitate the churning process.

The greater the angle of the beaters to the level surface of the cream the more force is required to operate the churn, and the more rapidly will the churning process be performed.

When the beaters are arranged at an angle of about forty-five degrees to the level surface of the cream the force of a strong man is required to operate the churn, and in that case the cream will be converted into butter in from one to three minutes.

The beaters being adjustable at any required angle, it is evident that they may be set to suit the strength of different operators—from a strong man to a woman or boy of comparatively small strength.

What I claim as new, and desire to secure by Letters Patent, is—

The combination, with the adjustable beaters A, of the single V-shaped breaker F, located at or near the center of the churn, and arranged in relation to the beaters as shown, so as to divide the cream-currents and conduct them upward and outward toward the opposite ends or sides of the churn to produce a partial vacuum in and to facilitate the churning of the cream, substantially as described.

In testimony that I claim the foregoing as my own invention I affix my signature in presence of two witnesses.

EUGENE SHEPARD GIBBS.

Witnesses:
WILLIAM P. ROGERS,
JAMES C. WORLY.